United States Patent
Kojima et al.

(10) Patent No.: US 6,978,219 B2
(45) Date of Patent: Dec. 20, 2005

(54) MEASUREMENT DATA COLLECTION APPARATUS

(75) Inventors: Koichi Kojima, Suwa (JP); Yoshifumi Yoshida, Suwa (JP); Yuya Ichikawa, Suwa (JP); Atsushi Hirai, Suwa (JP); Hideo Torii, Suwa (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 11/099,257

(22) Filed: Apr. 5, 2005

(65) Prior Publication Data

US 2005/0182580 A1 Aug. 18, 2005

Related U.S. Application Data

(62) Division of application No. 10/286,429, filed on Nov. 1, 2002, now Pat. No. 6,892,158.

(30) Foreign Application Priority Data

Mar. 18, 2002 (JP) .............................. 2002-073750

(51) Int. Cl.$^7$ ............................................ G06F 15/00
(52) U.S. Cl. ...................... 702/127; 702/182; 702/183; 702/186; 702/188
(58) Field of Search .............................. 702/127, 122, 702/123, 182, 183, 186, 188; 700/83, 84, 700/85, 108, 109

(56) References Cited

U.S. PATENT DOCUMENTS

| 4,665,621 A | 5/1987 | Ackerman et al. ............ 33/513 |
| 5,120,943 A | 6/1992 | Benz .......................... 235/375 |
| 5,956,658 A * | 9/1999 | McMahon .................... 702/83 |
| 6,615,133 B2 | 9/2003 | Boies et al. ................. 701/209 |
| 2003/0004691 A1 | 1/2003 | Michiwaki et al. ......... 702/188 |

* cited by examiner

Primary Examiner—Bryan Bui
(74) Attorney, Agent, or Firm—Harness, Dickey & Pierce, P.L.C.

(57) ABSTRACT

A measurement data collection apparatus includes at least a collection/analysis processing device having a measuring instrument interface for converting measurement data input from a measuring instrument into data of a form corresponding to measurement contents, and a measurement data collection interface for converting the data of the form corresponding to the measurement contents into measurement data of a predetermined form. The apparatus can process the results obtained from the measurement as electronic data irrespective of the measurement contents or a kind of the measuring instrument and can perform form printing or data processing such as arithmetic operations.

9 Claims, 7 Drawing Sheets

| CODE | MEASURING INSTRUMENT NAME | DATA COLLECTING/ANALYZING UNIT | CALIBRATION DATA |
|---|---|---|---|
| A A 1 | MEASURING INSTRUMENT3A-1 | A A C t r l | 01/11/12 |
| A A 2 | MEASURING INSTRUMENT3A-2 | A A C t r l | 01/10/14 |
| B B 1 | MEASURING INSTRUMENT3B | B B C t r l | 01/03/06 |
| C C 1 | MEASURING INSTRUMENT3C | C C C t r l | 01/08/25 |
| D D 1 | MEASURING INSTRUMENT3D | D D C t r l | 01/09/18 |
| E E 1 | MEASURING INSTRUMENT3E | E E C t r l | 01/06/09 |

MEASUREMENT DATA COLLECTION APPARATUS

CROSS REFERENCE TO RELATED APPLICATIONS

This application is a divisional application of U.S. Ser. No. 10/286,429, now U.S. Pat. No. 6,892,158, filed Nov. 1, 2002 which claims priority to Japanese Application No. 2002-073750 filed Mar. 18, 2002, all of which are incorporated by reference.

BACKGROUND OF THE INVENTION

1. Field of the Invention

The present invention generally relates to apparatuses for collecting measurement data and, more particularly, to control and analysis of measured data adaptable to different kinds of measuring instruments.

2. Description of the Related Art

Various kinds of controls such as product control and process control are performed when producing goods. The product control will be considered below. In order to control the quality of products and so on and to ensure that products are stably manufactured, it is necessary to periodically measure produced parts and finished products, as well as production equipment such as manufacturing equipment and dies, to check whether the manufactured parts comply with the specifications.

Inspection is performed to measure the size, precision, and so on of the goods and check whether they comply with the specifications or whether they exhibit an abnormal appearance. Generally, a measurer fills in predetermined positions in a predetermined form with measurement results obtained. Then, a manager, a schedule controller, or the like (one person may play both these roles) performs an analysis based on the form to carry out the maintenance and the like of the production equipment and measuring instruments.

Assisting apparatuses have been proposed for processing, for example, the measurement results input for the purpose of assisting such measuring jobs. The assisting apparatuses are designed to store measurement results collected (hereinafter, referred to as measurement data) in storage means within a collection apparatus or outside thereof.

In these assisting apparatuses, for example, measurement information for providing the measurer with measurement instructions is based on a measurement descriptor table, in which records describing objects to be measured, measurement locations, required measurement data, and kinds of measuring instruments used are arranged, and a control table having command extraction tables provided for each kind of measuring instrument. The control table is created by rearranging the records in the measurement descriptor table in order of measurement action and by automatically extracting them into one or a plurality of records that include commands corresponding to each element in the measurement descriptor table and to the measuring instruments used, and instruction information for the measurer. The assisting apparatuses give instructions to the measurer in accordance with the contents of the control table. The measurement data is collected by activating means for giving commands to the measuring instruments used in accordance with the contents of the control table and means for storing in order of measurement the data measured based on the given commands.

However, in the assisting apparatuses described above, the measuring instruments that can directly transmit and receive data signals to and from the apparatus are limited to the ones that can output signals including digital data based on command instructions. For the measuring instruments without such a function being used, for example, when an appearance test is performed, the measurer fills in a form of a paper medium with the measurement results and later inputs them as data into a host computer and so on. Therefore, such a system that prevents careless mistakes relating to the measurement such as entry errors, missing entries, and measurement errors (mixing up of the measuring instruments) has not yet been established. Also, it is hard to keep track of the status of measurement jobs. Worse still, the measurement data can only be input from the measuring instruments.

SUMMARY OF THE INVENTION

Accordingly, it is an object of the present invention to provide a measurement data collection apparatus capable of solving the above-mentioned problems.

According to an aspect of the present invention, a measurement data collection apparatus includes collection/analysis processing means having at least a measuring instrument interface for converting measurement data input from a measuring instrument into data having a form corresponding to measurement contents. The apparatus can accommodate the difference in data form to collect measurement results as electronic (for example, magnetic) data, irrespective of the measurement contents, including data input such as the results obtained by a appearance check, or the kind of measuring instrument differing in output (digital or analog) or presence of commands (instructions). Therefore, it is also possible to quickly and easily perform form printing based on the collected data and data processing by arithmetic operations and so on.

Preferably, the measurement data collection apparatus has the collection/analysis processing means further including a measurement data collection interface for converting the data having the form corresponding to the measurement contents into measurement data having a predetermined form. The apparatus can accommodate the difference in data form to collect the measurement results as electronic (for example, magnetic) data in a common form irrespective of the measurement contents. Therefore, it is also possible to quickly and easily perform the form printing based on the collected data and data processing by arithmetic operations and so on.

The collection/analysis processing means in the measurement data collection apparatus may send a signal giving an instruction to the measuring instrument in accordance with a form that is processible by the measuring instrument. Accordingly, it is possible to give instructions to control the measuring instrument.

Preferably, the collection/analysis processing means in the measurement data collection apparatus is provided for each of the measurement contents and each kind of the measuring instrument. The measurement data collection apparatus may further include control processing means for identifying the measurement contents and the kind of a designated measuring instrument based on measuring instrument data on items relating to the measuring instrument and for determining the collection/analysis processing means to be employed in processing. Accordingly, only identification of the measuring instrument can cause the control processing means to dynamically determine the collection/analysis processing means, which can perform the processing.

Preferably, the measuring instrument data for identifying the measuring instrument is provided for each measuring instrument in the measurement data collection apparatus. The measuring instrument data may correlate with the measurement data measured by the measuring instrument. Therefore, it is also possible to analyze the stored data in a time series manner to understand the trend in characteristics of the measuring instrument and so on.

The measurement data that is processed by the collection/ analysis processing means of the measurement data collection apparatus may be binary data. Accordingly, it is also possible to address the data such as OK or NG independently of the data form.

The measurement data collection apparatus further may include input means for inputting the measurement data. Accordingly, the operator can input the data such as numerical values, OK, or NG, which can be processed.

The measurement data collection apparatus further may include a recording medium for storing the measurement data. Therefore, the data can be read from the recording medium, etc., not only when actually performing the measurement, but also after finishing the measurement.

The measuring instrument interface in the measurement data collection apparatus preferably controls the associated measuring instrument based on data for controlling the associated measuring instrument. Accordingly, it is possible to give instructions to the measuring instrument to control it.

The measuring instrument interface in the measurement data collection apparatus preferably converts the measurement data differing between kinds of the measuring instrument into data having a predetermined form for each of the measurement contents. Accordingly, it is possible to unify the data form independently of the measuring instrument.

The collection/analysis processing means in the measurement data collection apparatus may send a signal for activating objects to be measured. Therefore, functional measurement of the objects to be measured can be performed by causing the objects to carry out patterned actions by the signal.

The measuring instrument data of the measurement data collection apparatus preferably includes data on a calibration date of the measuring instrument. Therefore, it is possible to obtain effective data showing the preciseness of the measurement, thus guaranteeing the quality of the objects to be measured. Also, the data thus obtained can provide reference information about the inspection time for the measuring instrument and so on.

The above and other objects, features, and advantages of the present invention will become clear from the following description of the preferred embodiments taken in conjunction with the accompanying drawings.

DESCRIPTION OF THE PREFERRED EMBODIMENTS

Figure 1:
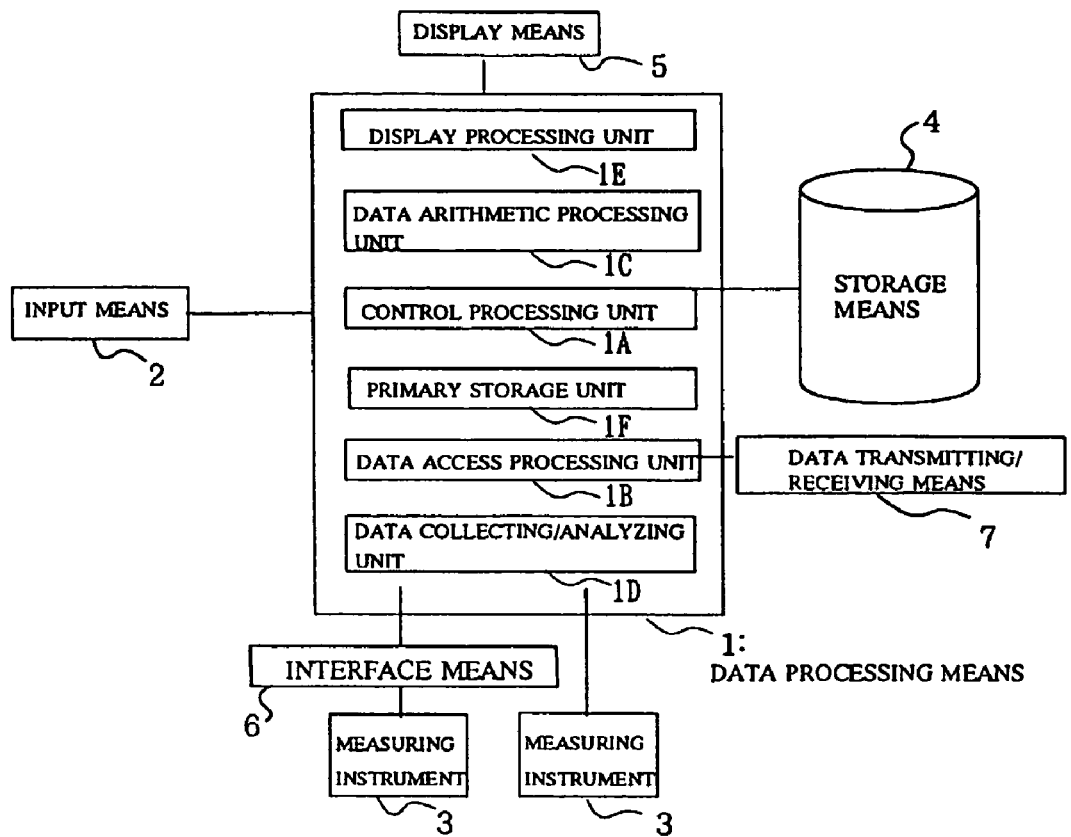
FIG. 1 is a block diagram showing the configuration of a measurement data collection apparatus according to an embodiment of the present invention.

FIG. 1 is a block diagram showing the configuration of a measurement data collection apparatus according to the embodiments of the present invention. Referring to FIG. 1, data processing means 1 includes a control processing unit 1A, a data access processing unit 1B, a data arithmetic processing unit 1C, a data collecting/analyzing unit 1D, a display processing unit 1E, and a primary storage unit 1F. The control processing unit 1A controls data communication among the units within the data processing means 1. It also makes a processing determination based on input data and outputs the data obtained as a result to the other units. The data access processing unit 1B performs processing required for data communication with the other means or units. For example, it performs the processing to create data for requiring and instructing a database system outside of the apparatus (not shown) (hereinafter, referred to as DB system) to store the measurement data collected, or it performs the processing to send this data. Also, the data access processing unit 1B performs the processing to create or send the data for requiring and instructing the reading of various data from the DB system. Further, it performs the processing to read all or part of various data stored in storage means 4 during measurement or to store the data in the storage means 4. The data arithmetic processing unit 1C carries out its operations based on the measurement data, such as calculating the allowance or calculating a circumference based on the coordinates of three points on the circumference, to calculate the new measurement data. It also carries out the operations based on the numerical values, operators, functions, and so on input by an operator. The data collecting/ analyzing unit 1D processes measurement signals to collect measurement data or groups of measurement data contained in the measurement signals. It also sends collection signals based on the instruction of the control processing unit 1A to a measuring instrument 3 to cause the measuring instrument 3 to perform measuring actions. Since the measurement signals and the collection signals here vary depending on the kind of the measuring instrument 3, a different kind of data collecting/analyzing unit 1D is used in accordance with the kind of the measuring instrument 3. Because different kinds of the data collecting/analyzing units 1D are provided independently of each other, one kind of data collecting/analyzing unit 1D can be added to or removed from the apparatus. Identification of the measuring instrument 3 used for the measurement and determination of the kind of the data collecting/analyzing unit 1D are performed by the control processing unit 1A. The control processing unit 1A identifies the measuring instrument 3 determined by the operator (measurer) based on the signals input as input signals from input means 2. It then determines the data collecting/analyzing unit 1D based on measuring instrument data including code data, proper name data, data for the data collecting/analyzing unit 1D, calibration date data, and so on. The display processing unit 1E creates and sends display signals to cause display means 5 to perform displaying. The primary storage unit 1F is provided for temporarily storing various data to be processed or that has been already processed by each of the units.

The input means 2 includes a pointing device, such as a mouse, and a keyboard. It converts the data input by the operator into the input signals and sends it to the data processing means 1. In some cases, it performs the same function as interface means 6, that is, it sends the input signals containing the measurement data as the measurement signals. In such a case, the input means 2 acts as means for inputting the measurement data as with the measuring instrument 3. The measuring instrument 3 sends the measurement signals based on measured magnitude (physical quantity). Here, the measuring instrument 3 includes, for example, both the instrument for measuring the sizes or weights of objects to be measured such as a digital caliper, a three-dimensional measuring instrument, or a micrometer microscope, and the instrument for measuring a physical quantity such as temperature of those other than the objects to be measured, for example, the surrounding environment (processing condition, processing environment). Further, the measuring means 3 includes instruments such as a camera for sending image data as signals. The measurement signals sent by the measuring instrument 3 here can be any kind of signals such as analog signals or digital signals. A plurality of measuring instruments 3 may be connected to the apparatus.

The storage means 4 is a so-called secondary storage, which is means for storing the data to be processed by the data processing means 1. It may also serve as storage means for storing the measurement data in some cases. The display means 5 is implemented by means such as a CRT (Cathode Ray Tube) or an LCD (Liquid Crystal Display). It performs displaying based on the display signals sent from the data processing means 1. The interface means 6 converts various measurement signals sent from the measuring instrument 3 into the measurement signals in such a form that can be processed by the data processing means 1. Therefore, the measuring instrument 3 which can send the measurement signals in such a form that can be processed by the data processing means 1 without the interface means 6 requires no interface means 6. Specifically, interfaces such as an RS-232C for converting serial signals, a Centronics interface for converting parallel signals, or a GP-IB serve as the interface means 6. Also, the interface means 6 also includes data reading means (for example, FDD or CD-ROM drive) that reads the data recorded on, for example, a recording medium such as FD or CD and sends it as the signals in such a form that can be processed by the data processing means 1. Data transmitting/receiving means 7, which is implemented by, for example, a modem, is means for communicating the signals, or the data, with other apparatuses via a network. Here, the data transmitting/receiving means 7 mainly serves as an interface when it stores various data in the DB system or when the data processing means 1 reads the data stored in the DB system for use.

Figure 2:
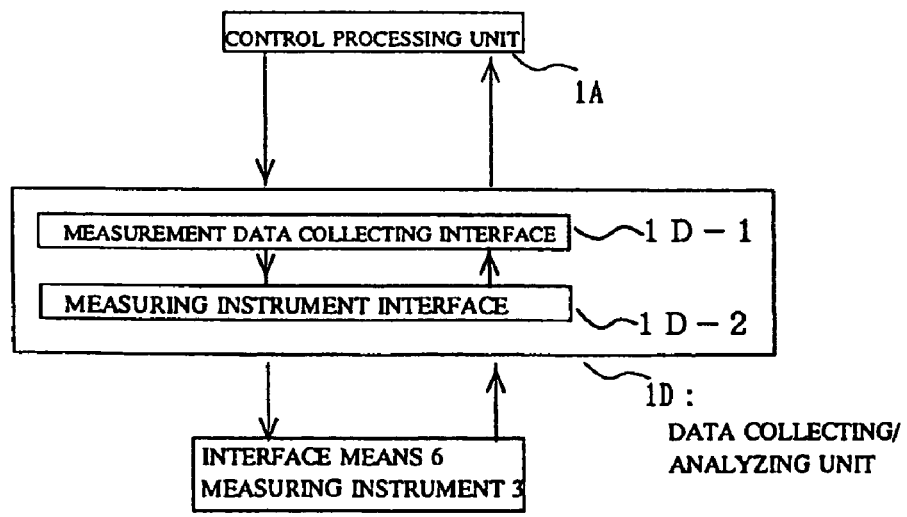
FIG. 2 is a block diagram showing the configuration centering on a data collecting/analyzing unit 1D of data processing means.

FIG. 2 is a block diagram showing the configuration centering on the data collecting/analyzing unit 1D of the data processing means 1. The data collecting/analyzing unit 1D includes a measurement data collection interface 1D-1 and a measuring instrument interface 1D-2. The measurement data collection interface 1D-1 serves as the interface between the control processing unit 1A and the measuring instrument interface 1D-2. It processes the measurement data, which is processed by the measuring instrument interface 1D-2, in accordance with measurement contents and converts it into measurement data in a predetermined form that can be processed by the control processing unit 1A and so on. The measurement data collection interface 1D-1 also causes the measuring instrument interface 1D-2 to process instructions (control commands) sent from the control processing unit 1A. The measuring instrument interface 1D-2 performs the processing to create command data for instructing the measuring instrument 3 when receiving the instructions from the control processing unit 1A via the measurement data collection interface 1D-1, and sends it to the measuring instrument 3 as the collection signals. The command data includes, for example, initialization command data for initializing the measuring instrument 3, data collection command data for requesting the measuring instrument 3 to send the measurement data, and termination command data for causing the measuring instrument 3 to terminate the measurement. Then, when the objects to be measured operate based on activation signals, the measuring instrument interface 1D-2 sends control signals for activating the objects to be measured to a signal generator (not shown) in order to inspect the actions of the objects. The signal generator sends the activation signals based on the sent signals to the measured objects to cause the objects to perform patterned actions. The measuring instrument interface 1D-2 also analyzes (protocol analysis) the measurement data included in the sent measurement signals, and converts it into the measurement data that can be processed by the measurement data collection interface 1D-1 independently from any kind of the measuring instrument 3.

Heretofore, measuring instruments capable of collecting data have been limited to the measuring instruments that can send signals which can be processed by means corresponding to the data processing means 1. Accordingly, in the measurement data collection apparatus according to the embodiments of the present invention, the interface means 6 and the data collecting/analyzing unit 1D appropriate for different kinds of measuring instruments 3 (including the input means 2) are provided. The interface means 6 converts the signals into the measurement signals in such a form that can be processed by the data processing means 1. Then, the data collecting/analyzing unit 1D determined by the control processing unit 1A in accordance with the kind of the measuring instrument 3 analyzes the measurement signals and processes them for conversion. After that, it stores all of the measurement data measured by different kinds of measuring instruments 3 as electronic data (including data that can be recorded in similar forms such as magnetic form) to enable them to be processed. Therefore, not only data such as numerical data, but also binary data such as OK/NG can be stored and so on as the measurement data. Here, the measuring instruments 3 of the same kind may be used depending on the type of the measurement. Since each of the measuring instruments 3, even when they are of the same kind, has different characteristics, each measuring instrument 3 is controlled separately regardless of the kind. However, with respect to the measuring instruments 3 of the same kind, the same data collecting/analyzing unit 1D can be used for processing. When the collection signals including control command data are sent to the measuring instrument 3, the corresponding data collecting/analyzing unit 1D also sends the collection signals including the data in such forms that different kinds of measuring instruments 3 can process, based on the instructions from the control processing units 1A. Further, the data collecting/analyzing unit 1D can send the control signals including the data for patterned actions to cause the objects to be measured to perform the patterned actions, when inspecting the actions of the objects to be measured in response to the instructions from the control processing unit 1A. Also, when it controls each measuring instrument 3, it also manages the data relating to the date when the measuring instrument 3 is calibrated to guarantee the product quality. Each unit included in the data processing means 1 can be configured as hardware (including a firmware), that is, can be configured as independent means, not as a part of the data processing means 1. However, when configuring the apparatus according to the embodiments of the present invention, the data processing means 1 in a data processing device is implemented by arithmetic and control means (a computer) having, for example, a CPU (Central Processing Unit) as a central unit, and the processing procedure of each unit is programmed in advance (configured as software). The above-mentioned function is realized by the arithmetic and control means, which executes the program and performs the processing based on the program. In such a case, the data communication among the units in the data processing means 1 described above is internally processed within the data processing means 1. Although each of the means is illustrated and described separately, it may be integrally configured.

Figure 3:
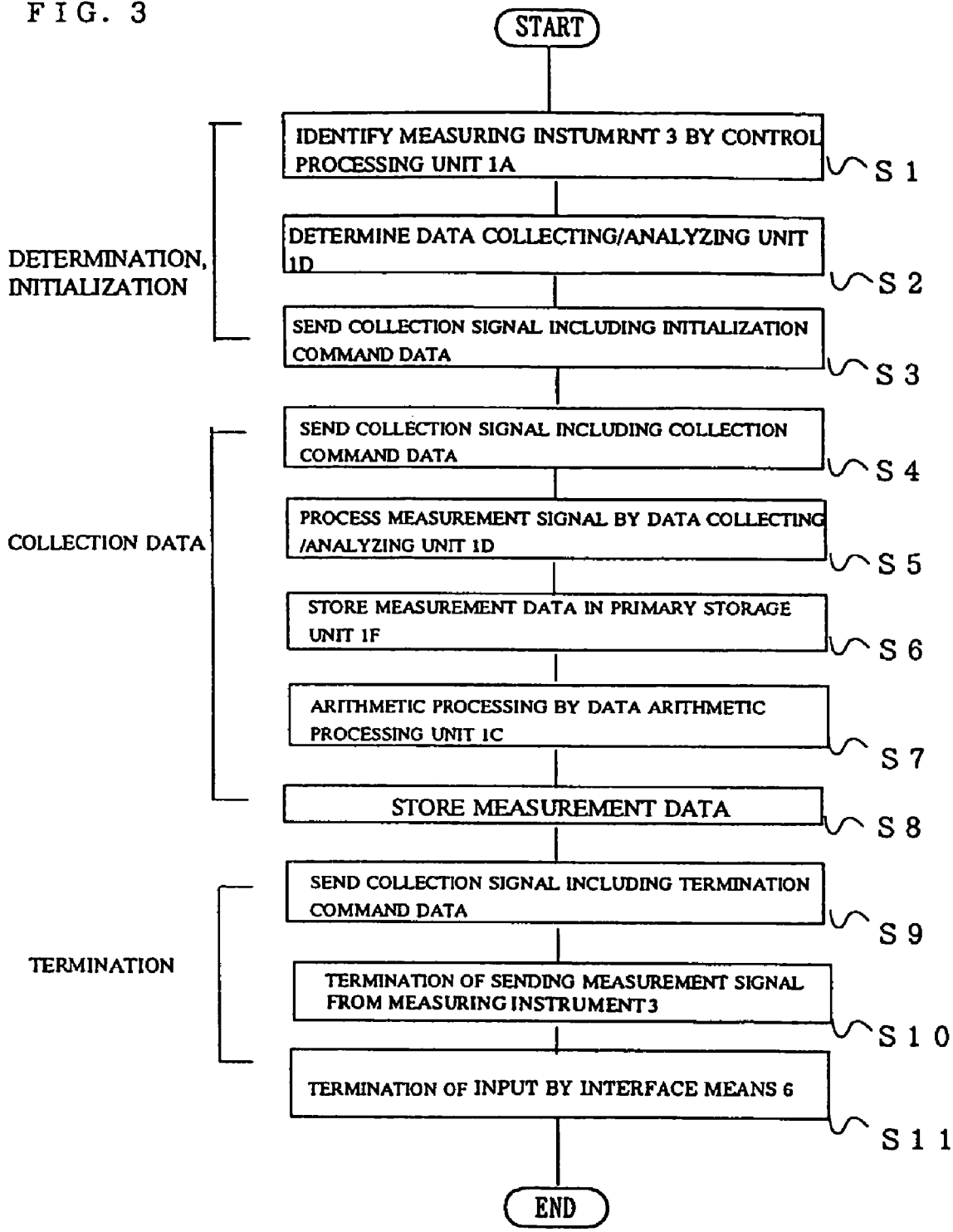
FIG. 3 is a flowchart showing the entire process for collecting measurement data.

FIG. 3 is a flowchart showing the entire process for collecting the measurement data. The action for collecting the measurement data centering on the data processing means 1 will be described here. The description will be made of the measuring instrument 3 acting based on control command signals. At first, the operator (measurer) determines the measuring instrument 3 used for the measurement, and inputs the name of the measuring instrument 3 using the input means 2 or selects it from various options. The control processing unit 1A identifies the measuring instrument 3 used for the measurement based on the input by the operator (S1). Next, the control processing unit 1A determines the data collecting/analyzing unit 1D in accordance with the identified measuring instrument 3 (S2). The control processing unit 1A then instructs the determined data collecting/analyzing unit 1D to send the collection signals including the initialization command data appropriate for the measuring instrument 3 (S3). After a predetermined period of time or when the instructions are provided from the operator via the input means 2, the control processing unit 1A causes the data collecting/analyzing unit 1D to send the collection signals including collection command data appropriate for the measuring instrument 3 (S4). The data collecting/analyzing unit 1D processes the measurement data included in the measurement signals sent from the measuring instrument 3 (S5). The control processing unit 1A temporarily stores the measurement data processed by the data collecting/analyzing unit 1D in the primary storage unit 1F (S6). The data arithmetic processing unit 1C performs the operations based on the measurement data stored in the primary storage unit 1F, and performs the processing to create the new measurement data in accordance with the operations (S7). The measurement data thus collected or operated and thus created and processed is stored in, for example, the DB system (S8). The control processing unit 1A causes the determined data collecting/analyzing unit 1D to send the collection signals including the termination command data appropriate for the measuring instrument 3 (S9). Then, it terminates the sending of the measurement signals from the measuring instrument 3 (S10) and terminates the receiving of the input from the interface means 6 (S11).

Figure 4:
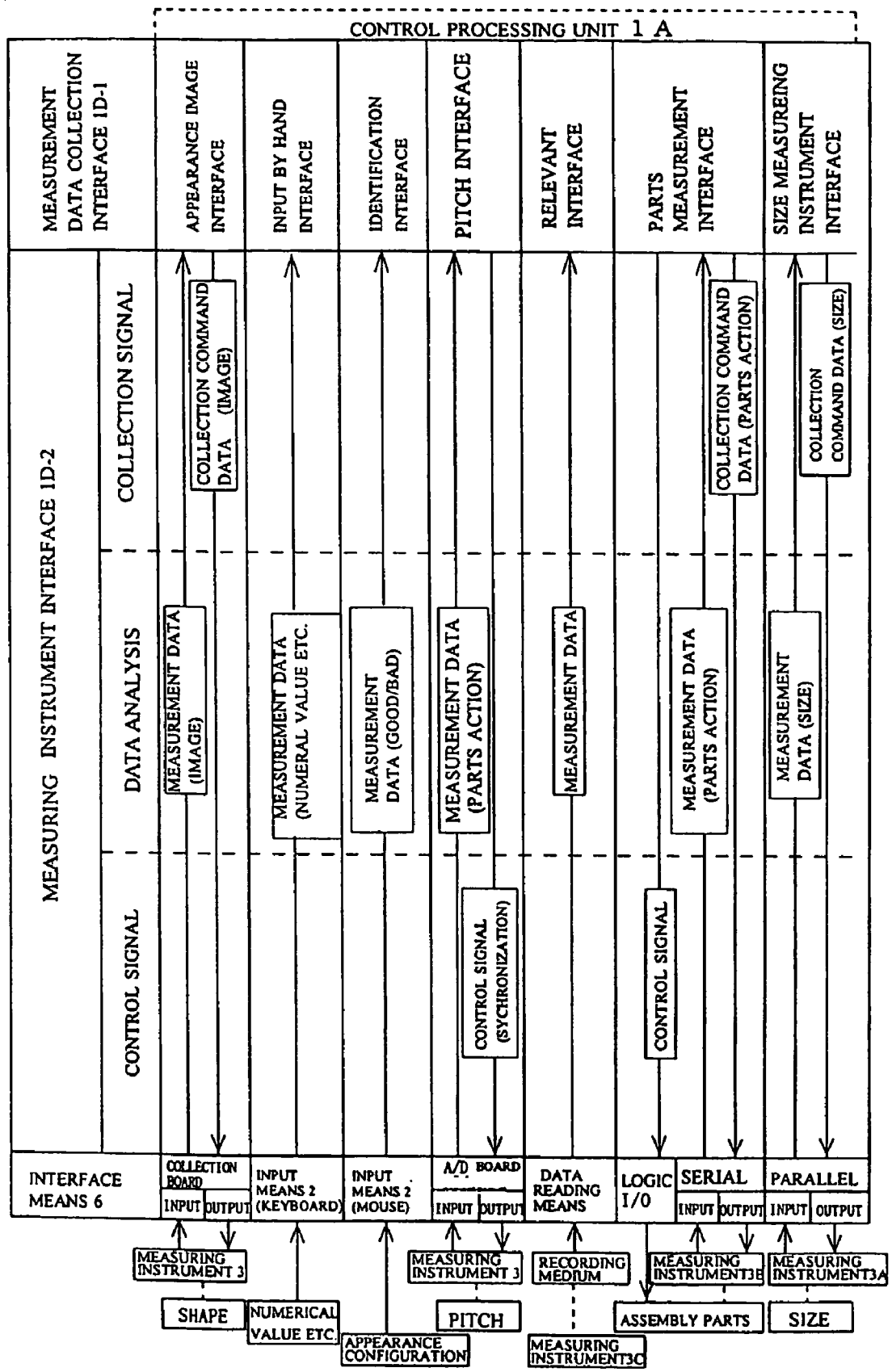
FIG. 4 is a diagram illustrating the relationships between different kinds of measuring instruments 3 and the data collecting/analyzing unit 1D.

FIG. 4 is a diagram illustrating the relationships between different kinds of measuring instruments 3 and the data collecting/analyzing unit 1D. Examples of items to be measured are shown in FIG. 4. Different kinds of measurement data collection interfaces 1D-1 are used in accordance with the measurement contents (the kind of measurement). Also, different kinds of measuring instrument interfaces 1D-2 are used in accordance with the kinds of the measuring instrument 3 and the interface means 6.

Figures 5, 6:
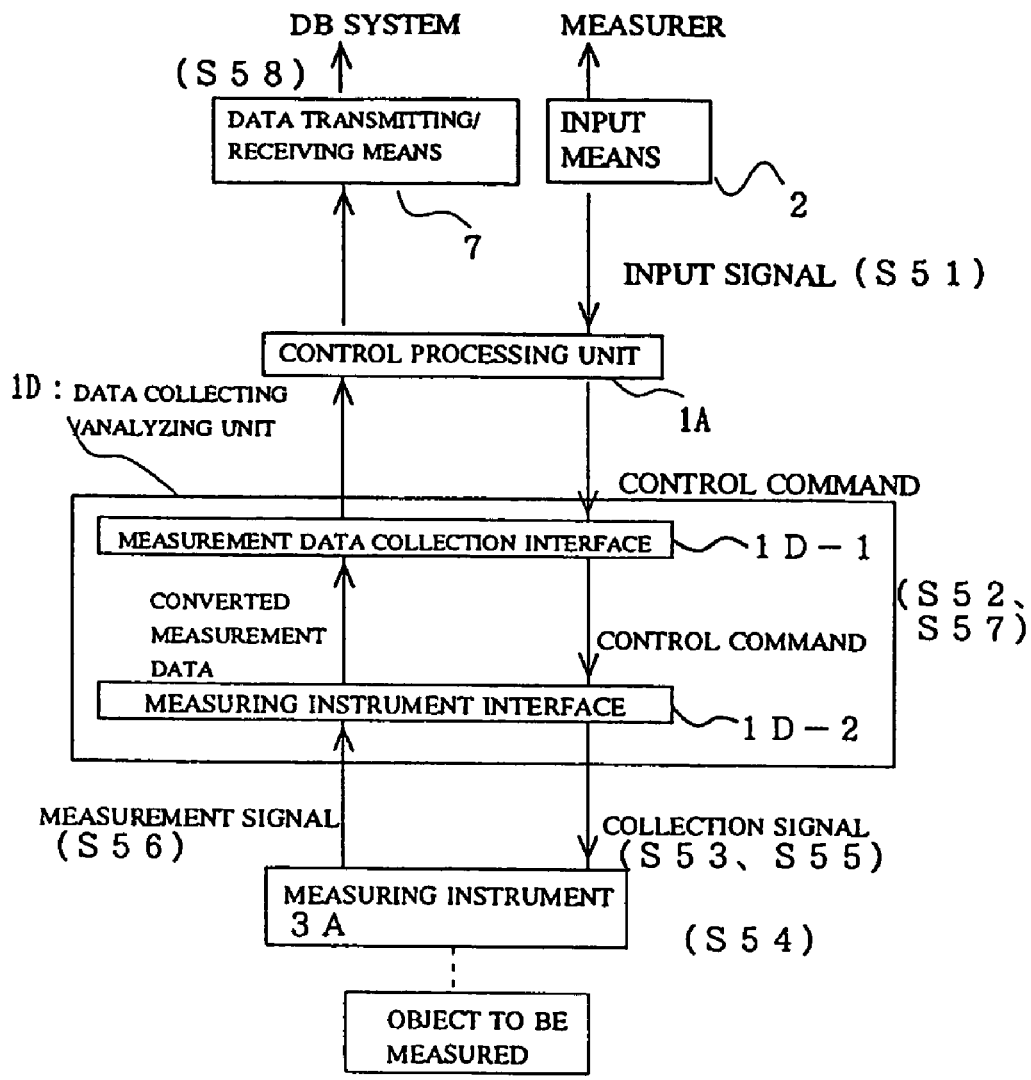
FIG. 5 is a block diagram showing the process of the actions of the measuring instrument involving size measurement centering on the data collecting/analyzing unit 1D.
FIG. 6 is a table showing measuring instrument data stored in storage means 14.

FIG. 5 is a block diagram showing the process of the actions of the measuring instrument 3 involving size measurement centering on the data collecting/analyzing unit 1D. The actions in some relationships will be described among those shown in FIG. 4. The interface means 6 is omitted in FIGS. 5, 7, 8, and 9 for clarity. First, the measuring instrument 3 involved in the size measurement will be described (the measuring instrument 3 involved in the size measurement is referred to as a measuring instrument 3A here). The data such as the object names to be measured, the code of the measuring instrument 3A used, and the measurer's name is input by the measurer (operator). The time of measurement and so on are also input at this time. The data, which is sent and included in the input signals, is processed by the control processing unit 1A. The control processing unit 1A then identifies the measuring instrument 3A input by the measurer based on the data of the measuring instrument name (S51). Here, it is assumed that a measuring instrument 3A-1 is input.

FIG. 6 is a table showing the measuring instrument data stored in the storage means 4. The data on items including types (measurement types such as digital caliper and metallograph, or signal modes) and characteristics with respect to each measuring instrument is called the measuring instrument data. Here, all of the measuring instrument data may be stored in the DB system. However, among measuring instrument data, the data concerning at least the codes, the measuring instrument names, the data collecting/analyzing unit 1D used in the measurement, and the calibration date is also stored in the storage means 4 of the data processing device in the embodiments of the present invention.

The control processing unit 1A dynamically determines the corresponding data collecting/analyzing unit 1D (AACtrl is used here) based on the identified measuring instrument (the measuring instrument 3A-1) (when configured as software, it executes the corresponding programs) to allow the data collecting/analyzing unit 1D to run (S52).

The measuring instrument interface 1D-2 of the determined data collecting/analyzing unit 1D performs the processing to create the initialization command data in response to the instructions by the control commands from the control processing unit 1A, and sends it as the collection signals to the measuring instrument 3A (S53). However, step S53 is omitted when no initialization is required.

When the measuring instrument 3A-1 can send the measurement signals, the measurer performs the measurement using the measuring instrument 3A-1 (S54). The measurement data (size) is temporarily stored in the measuring instrument 3A-1. When the measurement is finished, the measurer inputs the instructions for collecting data using the input means 2. The control processing unit 1A processes the input signals sent from the measurer. When the measuring instrument interface 1D-2 receives the instructions from the control processing unit 1A based on the processed input signals, it performs the processing to create the data collection command data (size) in accordance with the measuring instrument 3A (the measuring instrument 3A-1), and sends it as the collection signals (S55).

The measuring instrument 3A-1 sends the measurement signals containing the measurement data (size) based on the data collection command data (size) included in the collection signals. The measuring instrument interface 1D-2 analyzes the measurement data (size) included in the measurement signals sent from the measuring instrument 3A-1 (in some cases, through the interface means 6), and converts it into the data format that the other units can process (S56).

The collection process in accordance with the measurement contents is performed on the converted measurement data in the measurement data collection interface 1D-1 (S57). Further, the relevant processes to other data (for example, the measurement data concerning the surrounding environment, the measuring instrument data of the measuring instrument 3A-1, and so on) are performed in the control processing unit 1A. Depending on the cases, the data arithmetic processing unit 1C may perform the operations to create the new measurement data. Based on the processed results, the display processing unit 1E creates the display signals, which are displayed on the display means 5 in order to be shown to the measurer.

When the processes described above are finished, the data access processing unit 1B creates the instruction data for storing the data in the DB system and sends it as the signals. It then sends the processed data as the signals and stores it in the DB system. Here, the data can be stored in the storage means 4 (S58).

Figure 7:
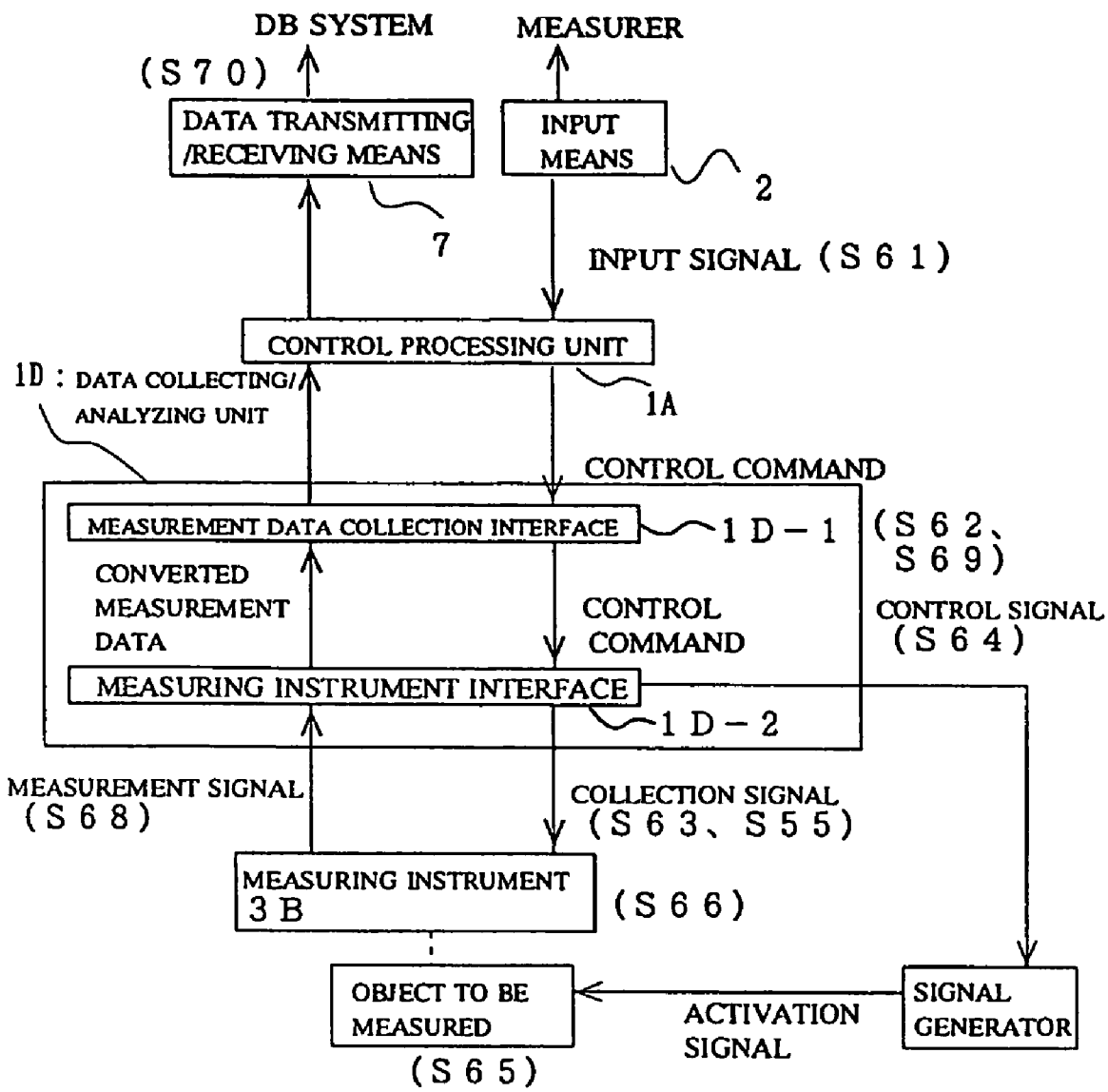
FIG. 7 is a block diagram showing the process of the actions of the measuring instrument, centering on the data collecting/analyzing unit 1D, involving action measurement for assembly parts (assembling parts)

FIG. 7 is a block diagram showing the process of the actions of the measuring instrument 3, centering on the data collecting/analyzing unit 1D, involved in the parts measurement for assembly parts (assembling parts). The description will be made of measuring the assembly parts (the measuring instrument 3 involved in the parts measurement is referred to as a measuring instrument 3B). Because steps S61 to S63 are processed in the same manner as for the measuring instrument 3A involving the size measurement described above, their description will be omitted here.

The measuring instrument interface 1D-2 of the determined data collecting/analyzing unit 1D (BBCtrl is used here) performs the processing to create the command data for activating the signal generator in response to the instructions from the control processing unit 1A. The measuring instrument interface 1D-2 sends the control signals (parts action) to the signal generator based on the command data (S64), and causes the objects to be measured to perform the patterned actions (S65). The measurer carries out the measurement using the measuring instrument 3B based on the actions (S66). The measurement data (parts action) is temporarily stored in the measuring instrument 3B. When the measurement is finished, the measurer inputs the instructions for collecting the data using the input means 2. The control processing unit 1A processes the input signals sent from the measurer. The measuring instrument interface 1D-2 performs the processing to create the collection command data (parts action) in response to the instructions from the control processing unit 1A. It then converts the collection command data (parts action) into the data appropriate for the kind of the measuring instrument 3B, and sends it as the collection signals (S67). Because the subsequent steps S68 to S70 are processed in the same manner as steps S56 to S58 of the measuring instrument 3A involving the size measurement described above, their description will be omitted here.

Figure 8:
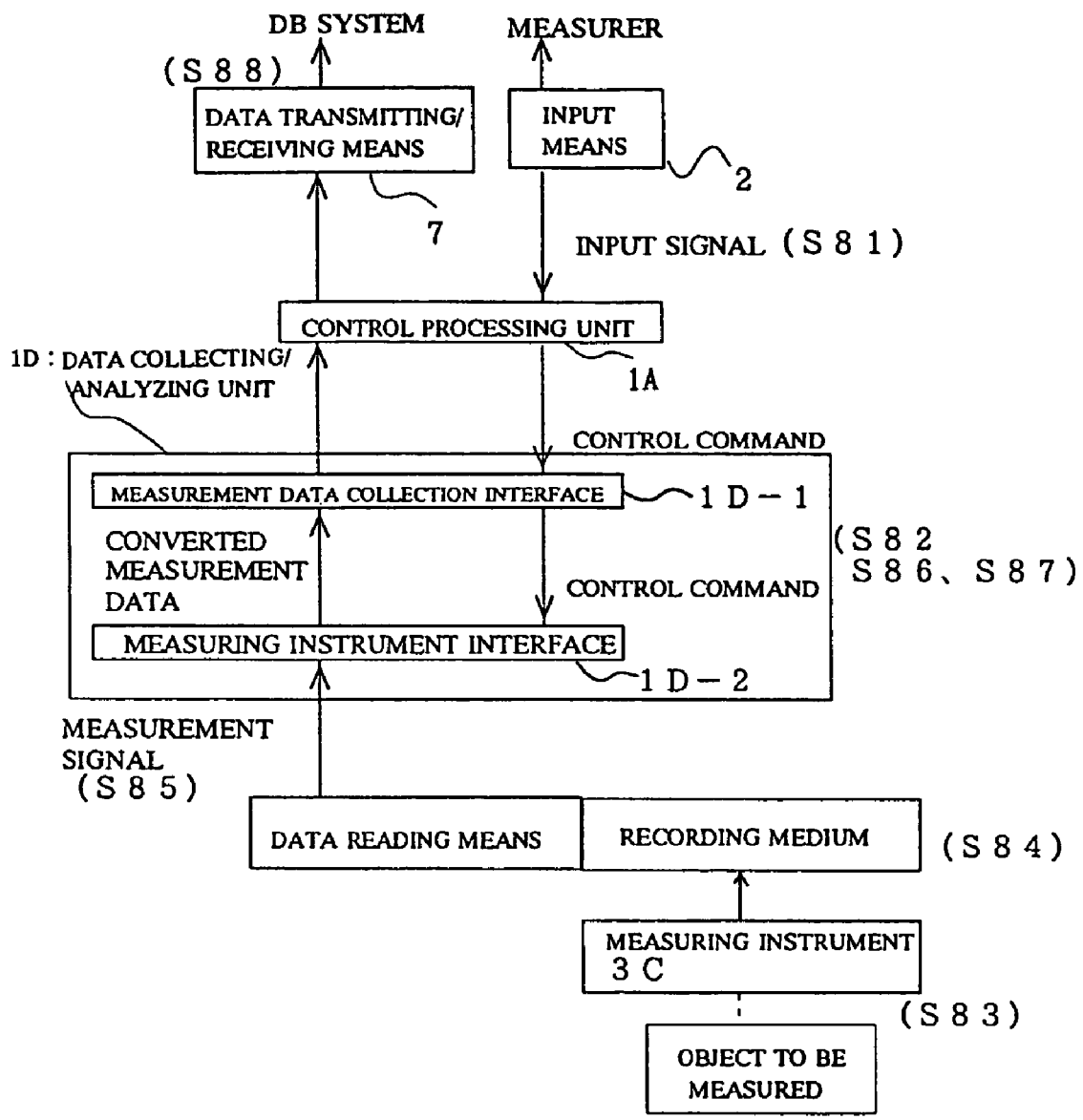
FIG. 8 is a block diagram showing the process of the actions for processing the measurement data recorded on a recording medium centering on the data collecting/analyzing unit 1D.

FIG. 8 is a block diagram showing the process of the actions for processing the measurement data recorded on the recording medium centering on the data collecting/analyzing unit 1D. The description will be made of processing the measurement data recorded on the recording medium (the measuring instrument 3 for recording the measurement data on the recording medium is referred as to a measuring instrument 3C). Because steps S81 and S82 are processed in the same manner as steps S51 and S52 of the measuring instrument 3A involving the size measurement described above, their description will be omitted here.

The measurer performs the measurement using the measuring instrument 3C (S83). It then records the measurement data by the measuring instrument 3C on the recording medium such as a FD (S84). Since this job is executed separately from the actions of the apparatus, it may not be necessarily performed after steps S81 and S82.

The operator for operating the data processing means 1 (regardless of being the measurer) sets the recording medium so as to cause data reading means serving as the interface means 6 to read the measurement data by the measuring instrument 3C. The control processing unit 1A identifies the instructions from the operator included in the input signals from the input means 2, and causes the data reading means to read the measurement data recorded on the recording medium and to send it to the data processing means 1 as the signals (S85).

The measuring instrument interface 1D-2 analyzes the measurement data included in the signals from the data reading means and converts it into the data format that the other units can process (S86). The converted measurement data is processed in accordance with the measurement contents in the measurement data collection interface 1D-1 (S87). Further, the relevant processes to other data (for example, the measurement data concerning the surrounding environment, the measuring instrument data of the measuring instrument 3C, and so on) are performed in the control processing unit 1A. Depending on the cases, the data arithmetic processing unit 1C may perform the operations to create the new measurement data. Based on the processed results, the display processing unit 1E creates the display signals, which are displayed on the display means 5 in order to be shown to the operator.

When the processes described above are finished, the data access processing unit 1B creates the instruction data for storing the data in the DB system and sends it as the signals. It then sends the processed data as the signals and stores it in the DB system. Here, the data can be stored in the storage means 4 (S88).

Figure 9:
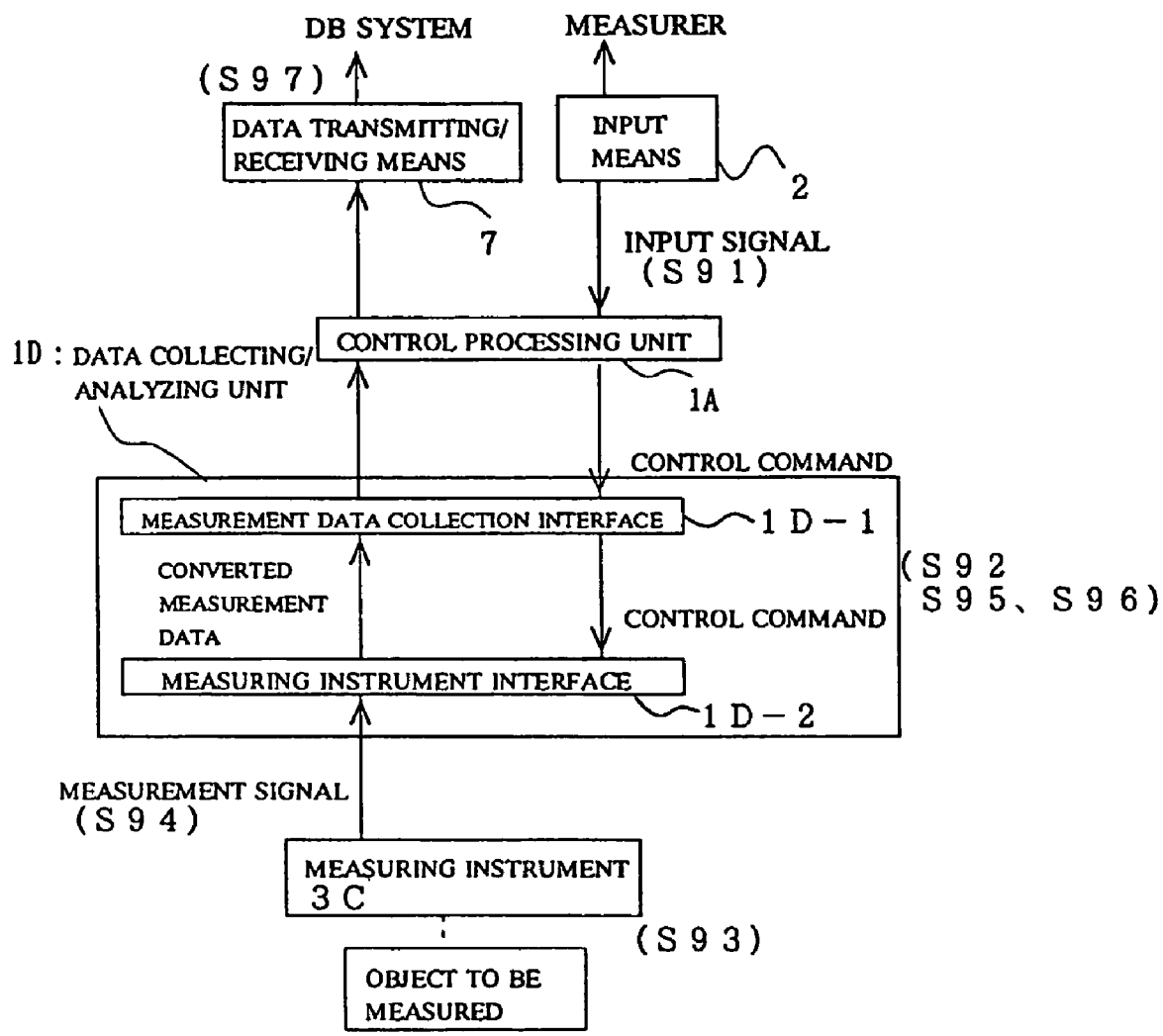
FIG. 9 is a block diagram showing the process of the actions of the measuring instrument 3 that is not required to send the collection signals centering on the data collecting/ analyzing unit 1D.

FIG. 9 is a block diagram showing the process of the actions of the measuring instrument 3, that is not required to send the collection signals, centering on the data collecting/analyzing unit 1D. The measuring instrument 3 that is not required to send the collection signals is referred to as a measuring instrument 3D. Because steps S91 and S92 are processed in the same manner as steps S51 and S52 of the measuring instrument 3A involving the size measurement described above, their description will be omitted here.

The measurement data collection interface 1D-1 and the measuring instrument interface 1D-2 of the determined data collecting/analyzing unit 1D (DDCtrl is used here) enter a waiting state for the measurement signals in response to the instructions from the control processing unit 1A.

The measurer performs the measurement using the measuring instrument 3D (S93). When the measurement signals are sent from the measuring instrument 3D (S94), the measuring instrument interface 1D-2 analyzes the measurement data included in the measurement signals sent from the measuring instrument 3D (in some cases, through the interface means 6), and converts it into the data format that the other units can process (S95).

The converted measurement data is processed in accordance with the measurement contents, in the measurement data collection interface 1D-1 (S96). Further, the relevant processes to other data (for example, the measurement data concerning the surrounding environment, the measuring instrument data of the measuring instrument 3D, and so on) are performed in the control processing unit 1A. Depending on the cases, the data arithmetic processing unit 1C may perform the operations to create the new measurement data. Based on the processed results, the display processing unit 1E creates the display signals, which are displayed on the display means 5 in order to be shown to the measurer.

When the processes described above are finished, the data access processing unit 1B creates the instruction data for storing the data in the DB system and sends it as the signals. It then sends the processed data as the signals and stores it in the DB system. Here, the data can be stored in the storage means 4 (S97).

In accordance with the embodiments of the present invention, as described above, the control processing unit 1A dynamically determines the data collecting/analyzing unit 1D to run, which is provided in the different kinds of the measuring instrument 3, based on the instructions from the measuring instrument 3 by the measurer, and different measurement signals are processed depending on the kinds of the measuring instrument 3. Accordingly, the measurement data having different formats can be stored as electrical data irrespective of the kind of the measuring instrument 3 or the measurement contents. Also, the measurement data can be input not only from the measuring instrument 3, but also from the input means 2 such as a keyboard. Further, the data recorded on the recording medium can be input. Therefore, all of the measurement data can be stored as the electrical data with no intervals and it is also possible to perform form printing. Because sending the control signals from the data collecting/analyzing unit 1D can cause the objects to be measured to perform the patterned actions, which can be checked and can be made the measurement data, the action checks of the assembly parts such as an ink discharge test of inkjet heads can be easily performed. The same data collecting/analyzing unit 1D can be used for the measuring instruments 3 of the same kind even if they have different measuring instrument data respectively. Further, each of the measuring instruments 3 has the data on its calibration date as the measuring instrument data, thus being assured that products of high quality can be achieved.

The entire disclosure of Japanese Patent Application No. 2002-073750 filed Mar. 18, 2002 is incorporated by reference.

What is claimed is:

1. A method of collecting measurement data comprising steps of:
    converting measurement data input from a measuring instrument having a form corresponding to the measuring instrument into data having a form corresponding to measurement contents and kinds of measurement;
    converting input control command data into control data corresponding to the measuring instrument to control the measuring instrument; and
    sending the control data to the measuring instrument to perform collection/analysis processing of measurement data of the measuring instrument.

2. The method according to claim 1, wherein the collection/analysis processing sends a signal for giving an instruction to the measuring instrument in accordance with a form that is processible by the measuring instrument.

3. The method according to claim 1, wherein the collection/analysis processing is provided for each of the measurement contents or measuring instruments respectively; and wherein the method further comprising steps of:
    identifying the measurement contents and the kind of a designated measuring instrument based on measuring instrument data on items relating to the measuring instruments; and determining a collection/analysis processing to be employed of each collection/analysis processing.

4. The method according to claim 3, wherein the method further comprising a step of;
    correlating the measurement data measured by the measuring instrument with measuring instrument data for identifying the measuring instrument provided for each measuring instrument.

5. The method according to claim 3, wherein the measuring instrument data includes data on a calibration data of the measuring instrument.

6. The method according to claim 1, wherein the collection/analysis processing processes binary data.

7. The method according to claim 1, wherein the collection/analysis processing processes measurement data input by input means.

8. The method according to claim 1, wherein the collection/analysis processing processes measurement data stored in a recording medium.

9. The method according to claim 1, wherein the method further comprising a step of sending a signal for activating an object to be measured.

* * * * *

UNITED STATES PATENT AND TRADEMARK OFFICE
CERTIFICATE OF CORRECTION

PATENT NO. : 6,978,219 B2  
APPLICATION NO. : 11/099257  
DATED : December 20, 2005  
INVENTOR(S) : Koichi Kojima et al.

Page 1 of 1

It is certified that error appears in the above-identified patent and that said Letters Patent is hereby corrected as shown below:

Title Page, Inventors, Item (75): Col. 1   Inventors' residence "Suwa (JP)" should be:
-- Kojima, Shimosuwa-machi (JP)
Yoshida, Chino-shi (JP)
Ichikawa, Fujimi-machi (JP)
Hirai, Chino-shi (JP)
Torii, Matumoto-shi (JP) --

Title Page, References Cited, Item (56):   Insert under FOREIGN DOCUMENTS:
Col. 2   -- WO 97/10491     3/1997     PCT
CN 1199463A     9/1996     China --

Signed and Sealed this

Nineteenth Day of September, 2006

JON W. DUDAS  
*Director of the United States Patent and Trademark Office*